(12) United States Patent
Oberndörfer et al.

(10) Patent No.: US 11,183,900 B2
(45) Date of Patent: Nov. 23, 2021

(54) LINEAR DRIVE

(71) Applicant: DewertOkin Technology Group Co., Ltd., Jiaxing (CN)

(72) Inventors: Andreas Oberndörfer, Bielefeld (DE); Jürgen Martin, Bünde (DE)

(73) Assignee: DEWERTOKIN TECHNOLOGY GROUP CO., LTD, Jiaxing (CN)

( * ) Notice: Subject to any disclaimer, the term of this patent is extended or adjusted under 35 U.S.C. 154(b) by 0 days.

(21) Appl. No.: 16/349,685

(22) PCT Filed: Nov. 14, 2017

(86) PCT No.: PCT/EP2017/079207
§ 371 (c)(1),
(2) Date: May 14, 2019

(87) PCT Pub. No.: WO2018/087394
PCT Pub. Date: May 17, 2018

(65) Prior Publication Data
US 2019/0363602 A1    Nov. 28, 2019

(30) Foreign Application Priority Data

Nov. 14, 2016   (DE) .................. 20 2016 106 361.2

(51) Int. Cl.
*H02K 5/10*      (2006.01)
*H02K 7/06*      (2006.01)
(52) U.S. Cl.
CPC ............... *H02K 5/10* (2013.01); *H02K 7/06* (2013.01)

(58) Field of Classification Search
CPC .. H02K 7/06; H02K 5/10; H02P 6/006; H02P 7/02; H02P 8/005; H02P 25/06; H02P 25/32
See application file for complete search history.

(56) References Cited

U.S. PATENT DOCUMENTS

2006/0091762 A1    5/2006  Haneball et al.
2007/0144279 A1 *  6/2007  Wu .................. H02K 7/06
                                              74/22 A
2013/0285494 A1 * 10/2013  Iversen .............. F16H 25/20
                                              310/83

FOREIGN PATENT DOCUMENTS

| CN | 1747673 A      | 3/2006  |
| CN | 201008114 Y    | 1/2008  |
| DE | 202004002254 U1| 4/2004  |
| DE | 202006009957 U1| 11/2006 |
| DE | 202006014117 U1| 2/2008  |

(Continued)

OTHER PUBLICATIONS

Office Action dated Jul. 29, 2020 in Chinese Application No. 201780070457.1.

(Continued)

*Primary Examiner* — Bickey Dhakal
(74) *Attorney, Agent, or Firm* — Panitch Schwarze Belisario & Nadel LLP

(57) ABSTRACT

A telescopic tube for use in a linear drive to be applied in articles of furniture such as beds, chairs and the like has an outer tube accommodating an inner lift tube which is longitudinally displaceable within the outer tube by the linear drive and projects from the outer tube at a front end opposite to the linear drive. An end cover having a seal closes and seals the front end and prevents any media from entering the outer tube and the linear drive.

5 Claims, 19 Drawing Sheets

(56) References Cited

FOREIGN PATENT DOCUMENTS

| DE | 202010012908 U1 * | 2/2012 | ............. F16H 25/20 |
|---|---|---|---|
| DE | 202010012908 U1 | 2/2012 | |
| DE | 102011014567 A1 | 9/2012 | |
| EP | 3429065 A1 * | 1/2019 | ............... H02K 5/10 |
| WO | 2016045726 A1 | 3/2016 | |

OTHER PUBLICATIONS

Int'l Search Report and Written Opinion dated Apr. 13, 2018 in Int'l Application No. PCT/EP2017/079207, English translation of ISR only.

* cited by examiner

LINEAR DRIVE

CROSS-REFERENCE TO RELATED APPLICATIONS

This application is a Section 371 of International Application No. PCT/EP2017/079207, filed Nov. 14, 2017, which was published in the German language on May 17, 2018, under International Publication No. WO 2018/087394 A1, which claims priority under 35 U.S.C. § 119(b) to German Application No. 20 2016 106 361.2, filed Nov. 14, 2016, the disclosures of which are incorporated herein by reference in their entirety.

BACKGROUND OF THE INVENTION

The invention concerns a linear drive or a linear motor which therefore converts a rotary movement of a drive, in particular an electric motor, into a translation movement. Linear drive of that kind are frequently used for the motorized adjustment of articles of furniture, for example beds, in particular hospital beds, chairs or the like. Preferably a respective linear drive is used for adjusting the lying surface of a hospital bed and more specifically a linear drive for adjustment of a pivotably mounted head portion and a further, preferably separately controlled linear drive for adjusting or pivoting a foot portion of that lying surface upwardly out of the lying surface about a respective pivot axis.

A linear drive of that kind is known for example from German laid-open specification DE 10 2011 014567 A1. In that arrangement the spindle receiving means substantially comprises a cylindrical main body in which an insertion opening which is flattened at one side is provided at an end for making a non-rotatable connection, wherein a rear drive end which is correspondingly flattened at one side of a spindle is non-rotatably inserted into the insertion opening. Provided at that spindle receiving means around that insertion region is an insertion cylinder which is of a reduced size in relation to the outer cylindrical main body, the cylinder having an external pinion which engages into a receiving means of complementary configuration in positively locking relationship in the worm gear. In that way the rotary movement of the worm gear is transmitted to the spindle holder.

Although such linear drives represent a very compact and reliable drive train the production of those specific components is nonetheless relatively complicated and expensive insofar as the spindle having the external trapezoidal thread has to be milled away from one end, flattened to produce the joining surface and then provided at both ends with studs and threads, which involves multiple machining working steps. The spindle receiving means with the cylindrical external body and the receiving pinion is made from metal and in that respect has to be produced by machining, which is also complicated and expensive. At the same time however the compact structural configuration of such a linear drive is desired so that it is not simply possible to use a larger plastic housing or a larger arrangement involving stronger plastic in the constricted predetermined structural space.

BRIEF SUMMARY OF THE INVENTION

Taking that state of the art as its basic starting point the first technical object of the invention is to at least partially avoid those disadvantages and to develop a linear transmission of the kind set forth in the opening part of this specification in such a way that those disadvantages are at least partially overcome and in particular to provide a compact reliable linear transmission which in addition is markedly simpler and thus less expensive to manufacture.

According to the invention in a linear drive of the kind set forth in the opening part of this specification that first object is substantially already attained in that provided at the drive end of the spindle is at least one notch, recess or the like, that the spindle holding region of the spindle holder has plastic and that at least one clamping pin is inserted into the at least one notch between the spindle holder and the spindle. Advantageous developments are recited in the appendant claims.

That linear drive according to the invention is particularly suited to move high loads of between 6000 and 8000 Newtons and more, for which purpose preferably two diametrally opposite notches extending in the longitudinal direction are provided at the outer peripheral surface of the spindle thread, preferably over a length of between 25 and 30 mm, of a width of between about 1.5 and 2 mm, so that then two pins, a clamping sleeve or a hollow clamping pin of a suitably adapted pin diameter can be inserted or driven in to the end of those notches between the outer peripheral surface of the spindle holder, whereby the thread portions disposed there of the female thread are deformed and thus a fixed non-losable connection is produced between the outer spindle holder and the received spindle. According to the invention therefore the spindle no longer has to be made in the form of a metal part but can now be made in the form of a plastic part, in particular a plastic injection molding, for example including or completely made from polyamide or POM.

The configuration according to the invention thus allows a particularly compact structure if the spindle holder is arranged in the hollow shaft of the worm gear or is at least partially received thereby in the installed position.

In the preferred configuration the spindle holder includes a tubular receiving connecting portion for receiving the spindle, which in the installed position extends coaxially with respect to the spindle longitudinal axis. That receiving connecting portion is provided with a female thread acting in complementary relationship with the male thread used on the spindle, preferably therefore a female trapezoidal thread. In addition the spindle holder includes a connector for force-locking connection to the worm gear which in particular is in the form of a flange projecting peripherally radially from the outer peripheral surface of the receiving connecting portion, particularly preferably in the form of a connecting flange formed in one piece on the receiving connecting portion.

In a particularly stable configuration for particularly high loads of between 6000 and 8000 Newtons the spindle holder or the plastic of the spindle holder can be fiber-reinforced, in particular glass fiber-reinforced, for example with a proportion of 10-30% reinforcement filling.

That configuration also presents itself for the design of the worm gear, in particular when there is provided on the worm gear an additional coupling connecting portion projecting laterally from the plane defined by the tooth flank, and there is provided on the connector of the spindle holder or connecting flange of the spindle holder a joining surface which can be connected to a coupler of an emergency coupling or emergency adjuster upon coupling engagement, the coupler being arranged longitudinally displaceably on the coupling connecting portion of the worm gear. A clamping element which is operative between the worm gear and the coupler, preferably in the form of a spring, urges the coupler into the engagement position. That coupler forms the component part of an emergency coupler and permits emergency adjustment upon uncoupling, which may be necessary for example in the case of hospital beds in order to rapidly lower the head end or the foot end, more specifically without actuation of the electric motor.

Preferably this involves a mechanical coupler which is not loaded in the engagement position, that is to say in the non-actuated state connects the worm gear and the spindle together and it is only upon actuation of the emergency coupler or emergency adjustment that it provides for a freewheel movement in which the actuated components of the article of furniture, for example the head portion of a hospital bed, can be more rapidly lowered into the horizontal position.

The emergency coupler is preferably of a positively locking configuration for transmitting the greater loads, but it can also be of a frictionally locking configuration.

The positively locking emergency coupler includes a first tooth arrangement in indirect or in direct but non-rotatable connecting relationship with the worm gear. A further tooth arrangement is in indirect or in direct but in non-rotatable connecting relationship with the spindle or the spindle holder. Preferably the tooth arrangements for transmission of higher torque levels are in the form of splined shafts or in the form of structures of such a configuration. As explained hereinbefore that tooth arrangement is preferably in the form of an integral shaped part on the spindle holder, but it can also represent an additional component.

In addition the emergency coupler includes a sliding element which is displaceable in the longitudinal axial direction of the spindle and which in a preferred embodiment is in the form of an internally hollow sliding collar or sliding sleeve. The sliding element includes a joining structure which is complementary with the joining partners of the drive train and with which same non-rotatably connects together the worm gear and the spindle holder in the non-loaded rest position.

Actuation of that emergency adjustment is usually effected by way of a puller transmission including emergency pulls which are arranged laterally on the bed and which for example include a Bowden cable which transfers the coupler out of the engagement position in which it is prestressed by the spring into the release position and thus permits the required emergency adjustment of the spindle or the actuated article of furniture.

That configuration without an emergency coupler includes a worm gear having at least one joining or wedge spline surface provided within the hollow shaft, for forcelockingly and non-rotatably receiving the spindle holder which is of a complementary configuration for insertion into that at least one joining surface.

In contrast the variant with an emergency coupler has on the worm gear a coupling connecting portion which projects from the plane of the tooth flank and which can be non-rotatably connected to the sliding element of the coupler and for that purpose includes preferably external wedge portions or splines on which the coupler is longitudinally displaceably and non-rotatably carried. In this embodiment the spindle sleeve of the spindle holder has a coupling flange projecting radially from the longitudinal axis, with engagement surfaces which involve a non-rotatable operative connection with the coupler in the engagement position.

Preferably the coupler is in the form of a dog coupler and the joining surfaces of the coupling connecting portion as well as the coupling flange provided in complementary relationship on the spindle holder are in the form of corresponding splines or wedge portions, with which the coupler non-rotatably cooperates in the various positions.

The coupler includes as the sliding element preferably a sliding sleeve, that is to say a ring member which extends in an annular configuration around the coupling connecting portion and which is displaceable between the engagement position and the release position so that the sliding sleeve in the engagement position transmits a torque acting on the coupling connecting portion to the coupling flange of the spindle holder and does not transmit same in the release position.

Release of the coupler or the sliding sleeve is effected by way of pull means forming an emergency adjustment means for the actuation of a spring-loaded pull rod which pulls or transfers a swing arm from a spring-biased engagement position against the force of a spring into the releasing emergency release position. That swing arm is in particular in the form of a rocker, and therefore pivots about a pivot axis, wherein the spring-biased pull rod engages an actuating end of the rocker and the opposite end of the rocker engages the coupler, preferably by way of a groove-and-tongue connection.

The outside of the coupler can have for example a peripheral groove, into which engage engagement pins provided at both sides on the swing arm.

By virtue of the angle transmission portion being of a separable configuration the invention thus provides a modular system which can be simply transformed by replacing the worm gear and the spindle holder. There are therefore basically two embodiments, more specifically one without and one with the coupler. That without the coupler is shorter by between about 30 and 50 mm in comparison with the one with the coupler, because no coupler is required. Accordingly the lift tube can be moved into the outer tube further by that amount.

In the preferred configuration the linear transmission has a wrap spring brake. The wrap spring brake requires a pin or journal on which the turns of the wrap spring can be mounted. For that purpose arranging a brake pin or journal directly on the worm gear is an option that presents itself, more specifically preferably in an embodiment with a coupler in opposite relationship from the coupler connecting portion projecting laterally from the worm gear. That brake journal can additionally have pockets or recesses for a lubricant. In the installed position the turns of the wrap spring extend around that brake journal, wherein the inside diameter of the turns of the spring is slightly smaller than the outside diameter of the brake journal for implementing the required braking effect. The wrap spring brake ensures a self-locking action for the linear transmission even when the electric motor is unpowered.

An alternative brake arrangement is in frictional operative connection to the motor shaft, wherein friction surfaces act constantly on the motor shaft under resilient stressing and produce a constant braking moment. The braking moment is vanishingly small in comparison with a braking moment produced by the wrap spring, but promotes the mechanical internal friction of the drive train by the required amount for achieving the self-locking action. In an embodiment the brake element which is fitted on to the motor shaft is provided with a freewheel so that in a first direction of rotation it rotates with the motor shaft and in a second direction of rotation in opposite relationship to the first direction of rotation it is held non-rotatably by the freewheel and produces a braking moment on the motor shaft.

According to the invention therefore the essential component parts of the linear transmission can comprise plastic, in particular in the form of a plastic injection molding. In that respect it is advantageous for the wall thicknesses of those parts to be as uniform as possible so that, in the context of a cooling process, no cracks, shrink holes or other stresses occur, that is to say no heat distortion occurs, which is rather a problem in the case of thick-walled workpieces. For that purpose, when dealing with thicker workpieces, that is to say as from a wall thickness of 3 mm in solid material, then cavities, openings, recesses or the like are provided for that reason.

A further aspect of the invention which in turn is to be viewed separately from the linear drive and for which self-evidently protection is also claimed in this respect concerns the configuration of the emergency coupler, that is to say the connecting device for the pulling means for carrying out emergency adjustment of the emergency release coupling used in the linear transmission.

As explained hereinbefore that emergency adjustment is required for example if the hospital bed has to be rapidly moved from the position with the head and/or foot portion angled into the horizontally extending rest position, for example in the event of an emergency situation.

For that purpose a linear transmission known from the state of the art for a hospital bed includes an emergency coupler or emergency adjustment, which preferably includes at each side of the bed emergency handles with which such emergency adjustment can be carried out in order to convert the linear transmission from the coupled engagement position to the freewheel position, whereby the angled bed can be quickly moved into the horizontal, that is to say without the impediment of the electric motor and the transmission.

Those emergency pulls in the state of the art further include Bowden cables which guided over direction-changing rollers then act by way of a Bowden cable holder arranged substantially coaxially relative to the spindle, in particular on same by means of cable thimbles provided at the ends of the respective Bowden cable in same inserted in positively locking relationship in corresponding receiving openings. The existing apparatuses suffer from the disadvantage that the non-actuated side goes slack upon actuation and thus frequently comes lose or can come lose out of a holder for the emergency pull. That can be disadvantageous in the case of an operation or in relation to rapid movements in an emergency situation, in which case that emergency pull which is hanging out can become hooked up.

Taking that state of the art as the basic starting point the invention is also concerned with the further technical object of at least partially avoiding the disadvantages known from the state of the art, and providing an emergency coupling for an emergency adjustment which very substantially prevents unwanted slackening of the emergency pull which is not actuated.

In the case of an emergency coupler for emergency adjustment of the kind set forth in the opening part of this specification that is already achieved in that the Bowden cable holder is connected rotatably to a first end of a pull rod which with a second end engages the emergency coupler. That rotatable structure has particular advantages because the Bowden cable holder thus functions as an intermediate coupler which compensates for a pull on the emergency pull on the one side of the bed on the other non-actuated side in such a way that the non-actuated side remains tightened, or at any event goes slack only slightly, at a maximum 10% or not slack at all, but at any event the emergency pull therefore does not come lose from the holder.

Preferably provided between the pull rod and the Bowden cable holder is a pin which rotatably connects the two parts together. Particularly preferably the pull rod has a pin which extends transversely relative to the longitudinal axis of the pull rod and on which the Bowden cable holder is rotatably carried or snap-fitted thereon.

In the installation position therefore the Bowden cable holder extends like a T transversely relative to the longitudinal axis of the pull rod, more specifically preferably at its end which is the front end in the installation position, wherein the pivot axis or the axis of rotation between the Bowden cable holder and the pull rod preferably engages at the center of the Bowden cable holder so that therefore fixing of the Bowden cables is laterally of that central pivot point or point of rotation.

The Bowden cable holder is then of such a configuration that in the rest position it bears with the rear sides, that is to say the side facing towards the pull rod, against contact surfaces of the emergency coupler.

To implement a harmonic, that is to say smooth movement, rolling or sliding surfaces can be provided between those contact surfaces and the Bowden cable holder, the rolling or sliding surfaces preferably being in the form of semicircular projections.

In a preferred development those rear contact surfaces of the Bowden cable holder at the middle are inclined extending rearwardly, in particular at an angle of about 45°, in order therefore upon actuation of the Bowden cable holder on one side to cause stretching of the non-loaded Bowden cable on the opposite side in the manner of a rocker in order therefore for example to still better avoid the non-actuated Bowden cable from unintentionally jumping out by virtue of slackening thereof. In addition upon one-sided actuation of the Bowden cable, due to the slope of the rear contact surfaces, additional displacement of the pin is effected by an amount corresponding to the displacement of the Bowden cable holder.

The Bowden cable holder can be provided on a housing of the linear drive or can be fixed by way of a separate fixing arrangement to another component of the linear drive or bed. Particularly preferably that is provided at a clip or bracket fixed to the stationary outer tube of the linear drive.

The Bowden cable holder is preferably in the form of a plastic injection molding and preferably includes a central receiving means adapted for rotatable insertion of a rotary pin connected to the pull rod, and two insertion openings which are laterally spaced equidistantly from that central region for receiving the ends of the Bowden cables or the cable thimbles provided at the ends of the Bowden cables.

In addition besides the linear drive and the emergency adjustment arrangement, that is to say separately from those aspects of the invention, so that protection is also claimed separately for same, the invention concerns an end cover for media-tightly sealing off a telescopic tube of a linear drive.

The telescopic tube of a linear drive includes an outer tube which is adapted to receive a lift tube longitudinally displaceable relative thereto. In addition it includes a rear drive end, through which extends a spindle which is driven by an electric motor and on which there is carried a spindle nut which is longitudinally displaceable by rotation of the spindle and which engages the lift tube. Finally the telescopic tube has a front end or end face from which the inner tube projects from the outer tube. The end cover closes that end face or front end to prevent media entry at least at the front end, for which purpose the end cover includes a seal having at least one seal lip.

For sealing off parts which are moveable relative to each other in that way the state of the art, thus for example DE 10 2008 028 335 B3, discloses using two end caps which can be fitted on to tubes disposed one within the other, and having a felt ring disposed therebetween or an O-ring. Those felt or O-rings however can only be compressed to a maximum of between 5 and 10 percent of their radial extent before damage to the seal element occurs. With the existing production tolerances however that is not always sufficient or requires expensive quality control or also gives rise to rapid defects and leaks.

Taking that state of the art as its basic starting point the invention thus has the further, therefore third, technical object of at least partially avoiding those disadvantages and developing an end cover of the kind set forth in the opening part of this specification in such a way that those disadvantages are at least partially overcome and in particular providing an end cover which permits reliable sealing even in the case of relatively large tolerances between the joint components (outer tube, lift tube and end cover), in particular in relation to a stationary outer tube and a lift tube which is accommodated displaceably therein, in particular used in a linear drive as described hereinbefore.

According to the invention that object is attained in relation to an end cover of the above-mentioned kind in that the seal lip further includes a spring. Advantageous developments are recited in the appendant claims concerning the end cover.

The "spring seal" which is thus provided is highly flexible and robust and with surprisingly simple means can accept large manufacturing tolerances, for example between 0.5 and 1 mm. That solution is thus highly flexible in regard to defective installation and is therefore easy to fit. More specifically the spring always pulls the seal lip tight in the optimum fashion at the outside and in peripheral relationship on the outer peripheral surface of the lift tube. The seal lip therefore always fits closely in sealing relationship to the outer peripheral surface of the lift tube. In the manner according to the invention, by combination of the good flexibility of the seal together with the seal lip and the spring fitted in the region of the seal lip, this affords an increased contact pressure force for the seal lip against the lift tube while in other respects the seal in itself remains yielding and flexible. In addition the material of the seal can have good sliding properties in relation to the friction partner of the lift tube.

That spring which can be incorporated into the seal lip compensates in a particularly simple fashion for all tolerances which occur, in particular of the lift tube.

Particularly preferably the spring of the spring seal is in the form of a coil spring which surrounds the seal for the lift tube over the entire periphery thereof, being therefore also matched in size to the lift tube. Besides the inherent resilience of the seal therefore the coil spring provides a spring force which additionally peripherally applies pressure.

Instead of the coil spring it is also possible to use a further clamping rubber member as the spring.

The proposed spring-biased seal thus provides for the so-called "car wash suitability" in accordance with IP67W, that is to say provides for sealing integrity in relation to a strong jet of water, at high temperatures and with the use of chemicals.

The spring seal is preferably adapted to the geometry of the end cover. Preferably that includes a seal plate which covers the outer tube at the end and which defines the main sealing plane and which in the center embraces the spring-loaded seal lip for enclosingly bearing against the lift tube, and the outer peripheral surface of which includes an outer edge for embracingly bearing against the outer tube. Particularly preferably the spring-loaded seal lip extends forwardly out of the main seal plane and the outer edge extends rearwardly from that plane.

The end cover is preferably adapted for engagingly receiving the spring seal in the installation position, which is preferably effected by providing an attachment cap which can be fitted on to the end of the telescopic tube. In the preferred embodiment that is effected for example by the attachment cap, besides the cover region which at the end provides for extensive coverage of the outer tube, further having a receiving space for the spring seal. That receiving space which preferably projects forwardly out of the main sealing plane of the end cover can also form a second lift tube guide.

Particularly good guidance for the lift tube and good compensation for tolerance difference is achieved by the provision on the inside of the outer tube of a first lift tube guide enclosed by the end cover which can be fitted on to the telescopic tube on the outside.

In the particularly preferred embodiment the end cover includes an attachment cap which extends in a closure plane and which in the installation position is arranged transversely relative to the longitudinal axis of the telescopic tube, an external peripheral edge which is provided on the outside on the closure cap and extends transversely rearwardly from the closure plane for externally enclosing the outer tube, a receiving space provided forwardly from the closure plane for the spring seal and a second lift tube guide provided at the front edge of that receiving space. That end cover which is in the form of the attachment cap is preferably in the form of a plastic injection molding.

BRIEF DESCRIPTION OF THE SEVERAL VIEWS OF THE DRAWINGS

The detailed description hereinafter refers to the accompanying drawings forming part of the description of this invention and in which specific embodiments are shown for illustration, with which the invention can be carried into effect. In this respect directional terminology like for example "up", "down", "front", "rear", "forward", "rearward", and so forth are used in relation to the orientation of the Figure or Figures being described. As components of embodiments can be positioned in a number of different orientations the directional terminology serves for illustrative purposes and is no way restrictive. It will be appreciated that other embodiments can be used and structural or logical modifications can be made without departing from the scope of protection of the present invention. The following detailed description is not to be interpreted restrictively.

In the context of this description the terms "connected", "joined" and "integrated" are used to describe both a direct and also an indirect connection, a direct or indirect join and a direct or indirect integration. In the Figures identical or similar components are denoted by identical references insofar as that is appropriate.

Figure 1:
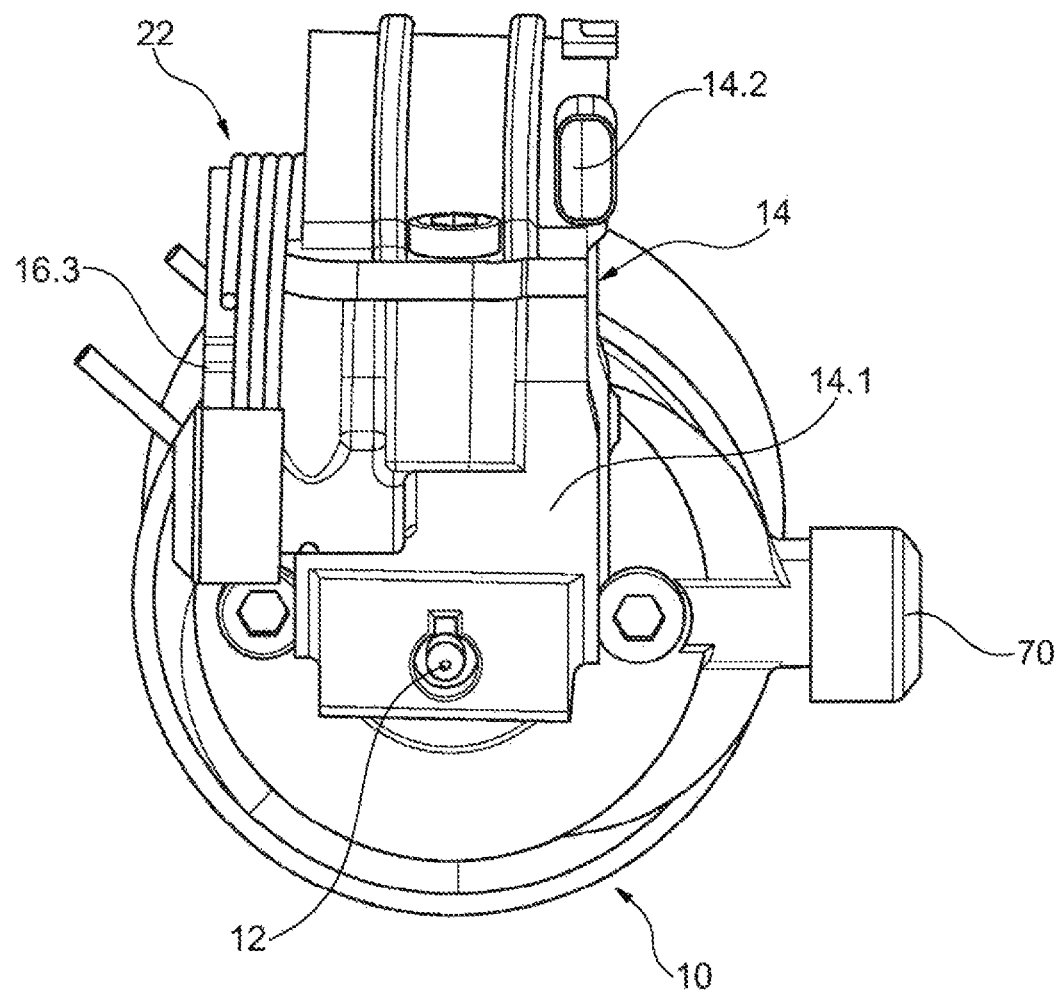
Figure 2:
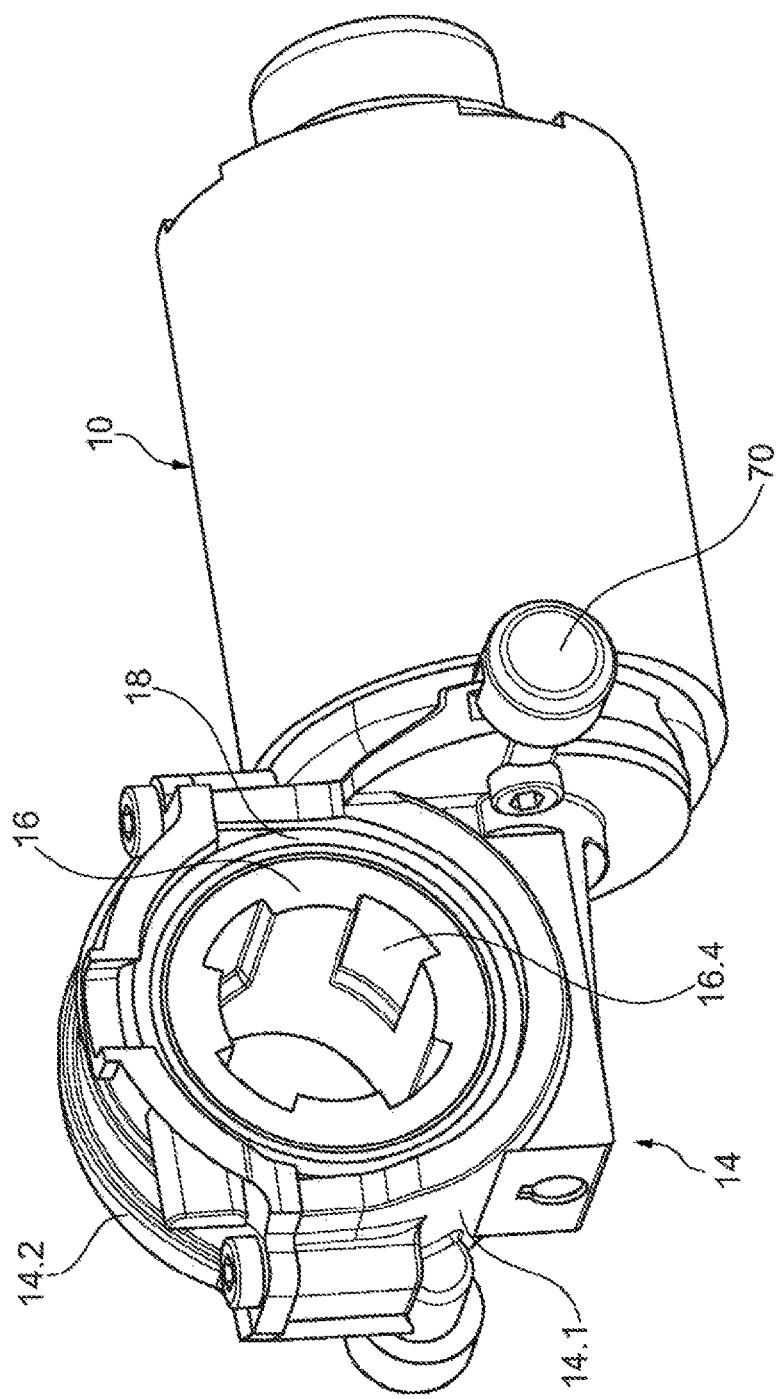
Figure 3:
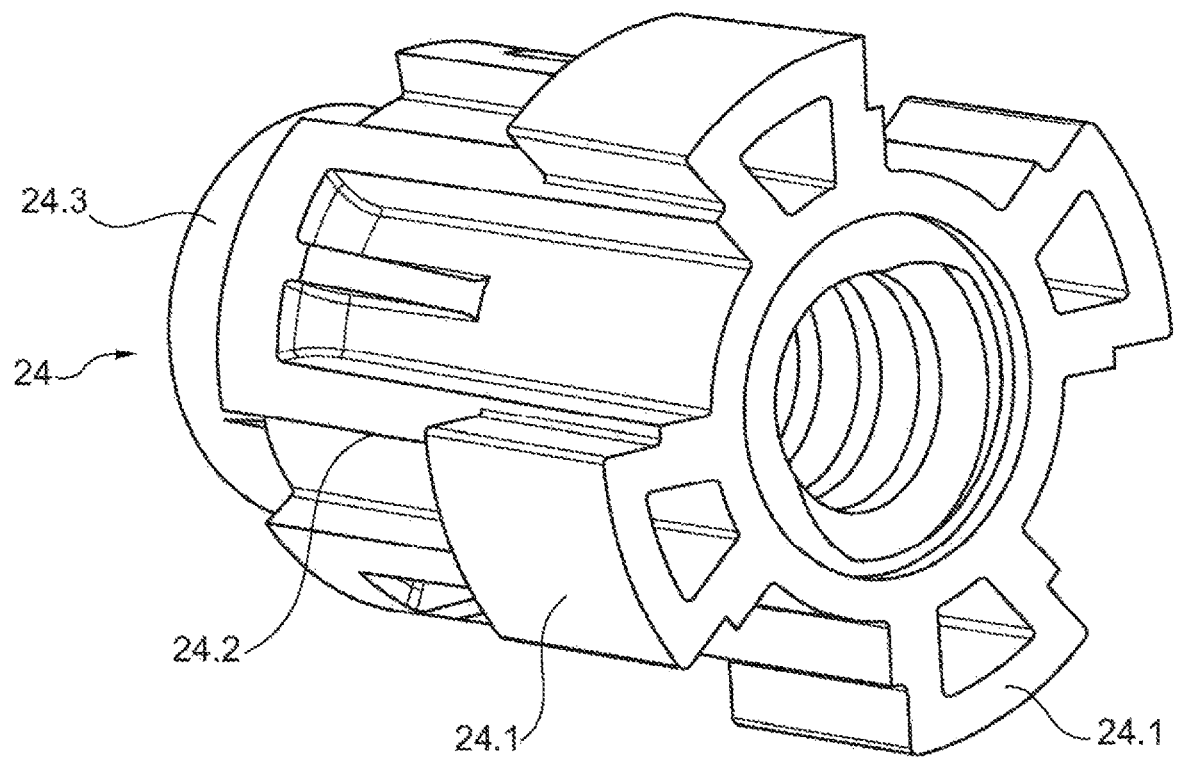
Figure 4:
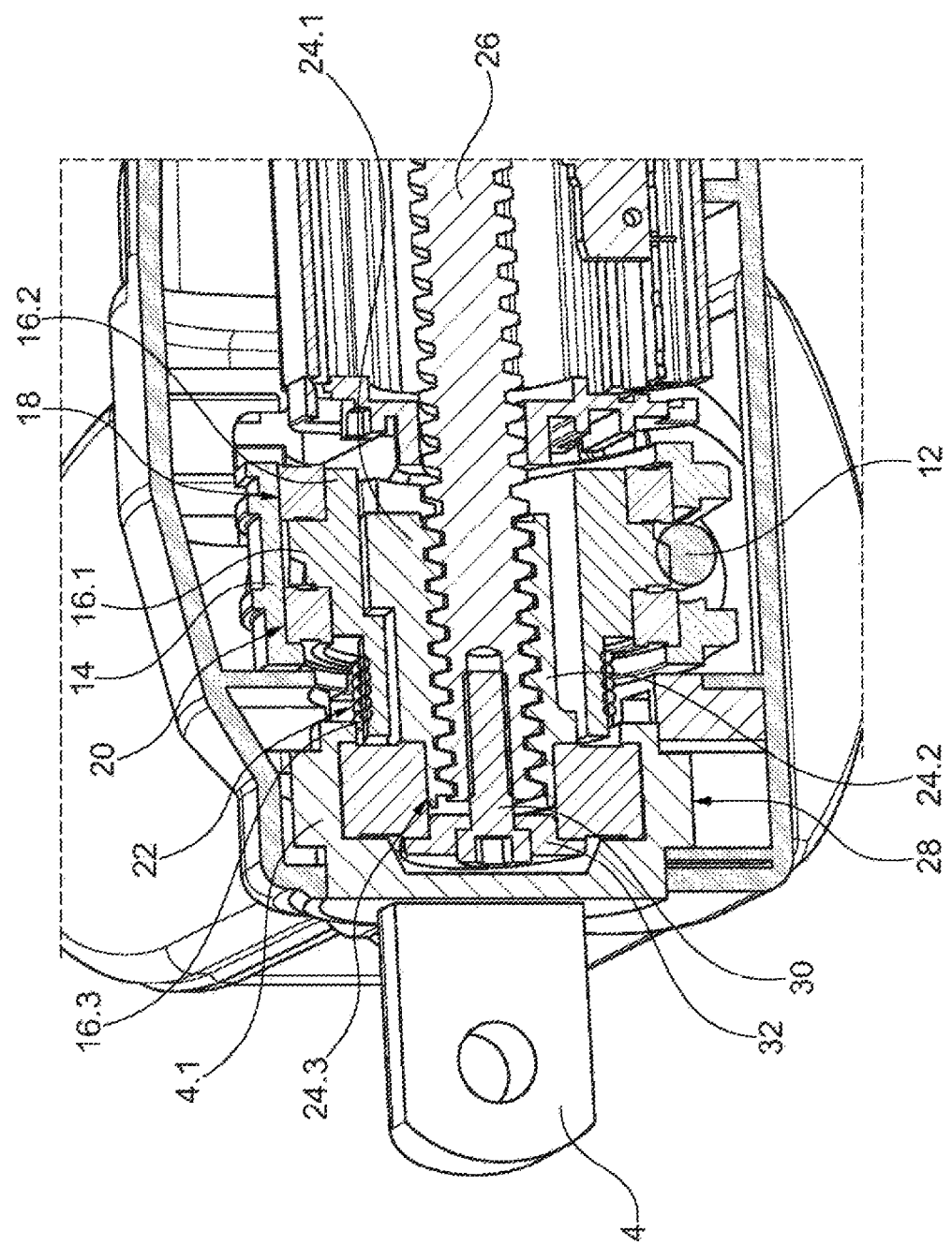
Figure 5:
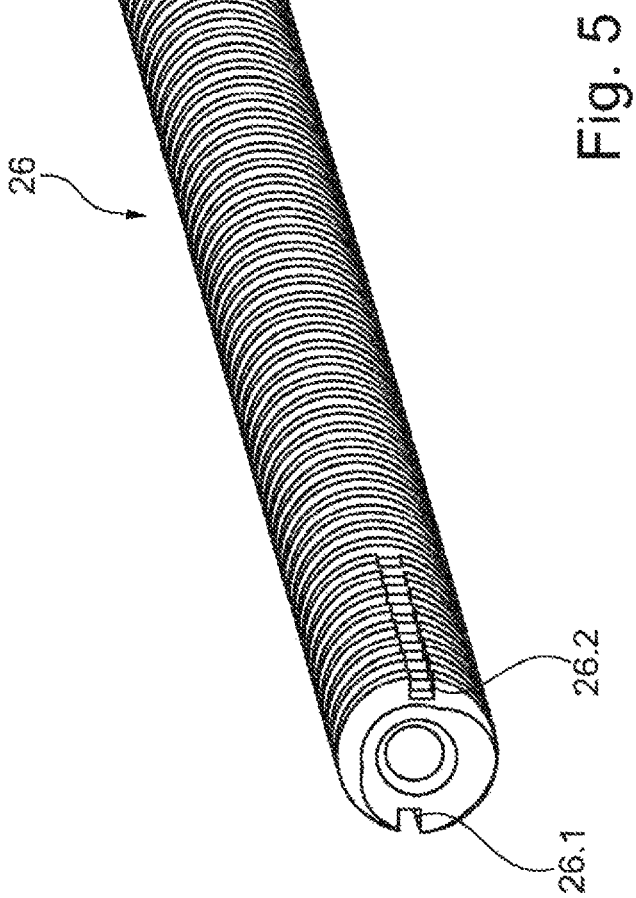
Figure 6:
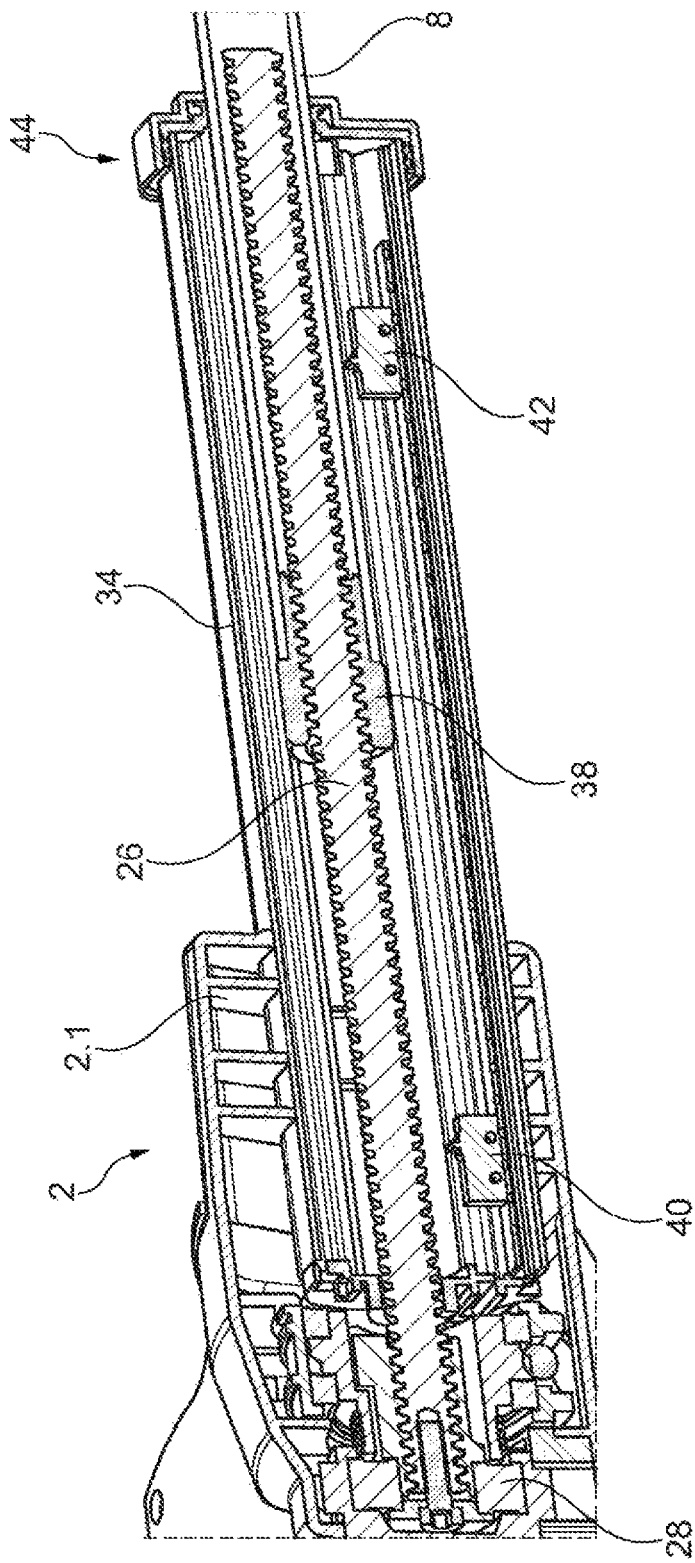
Figure 7:
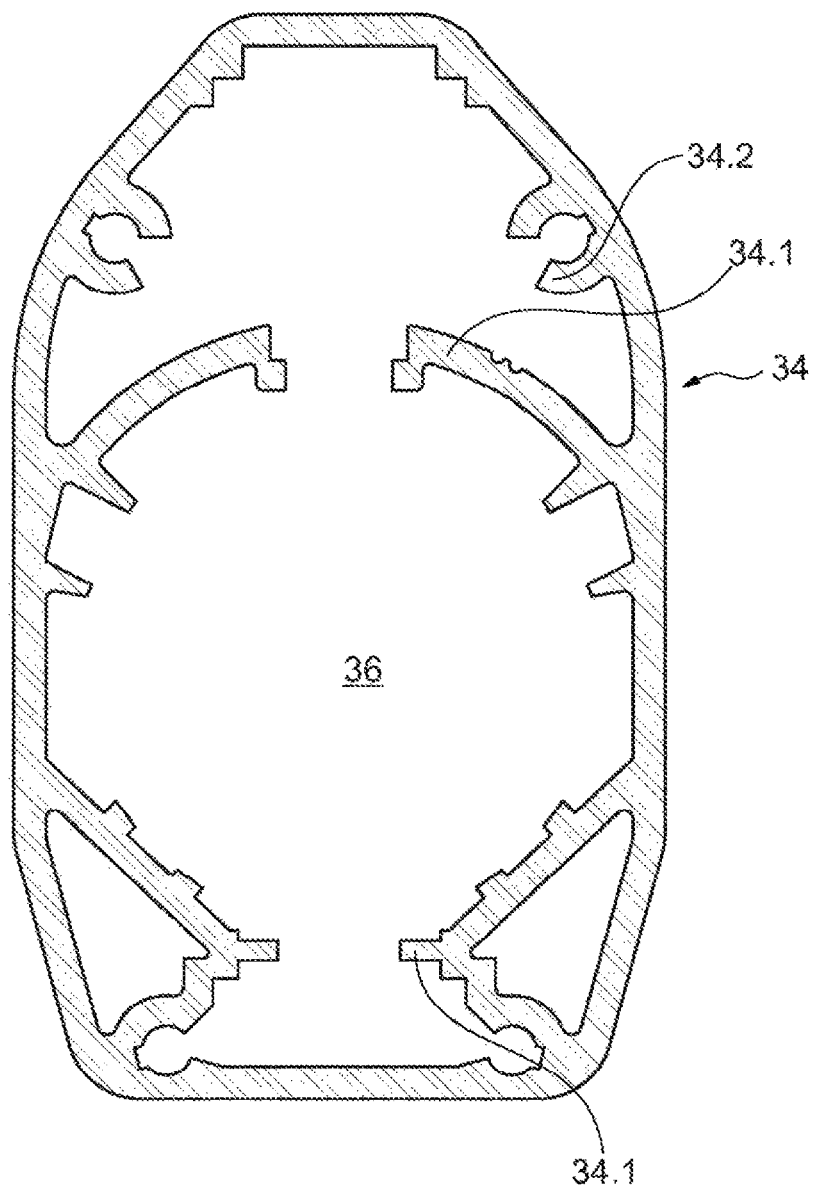
Figure 8:
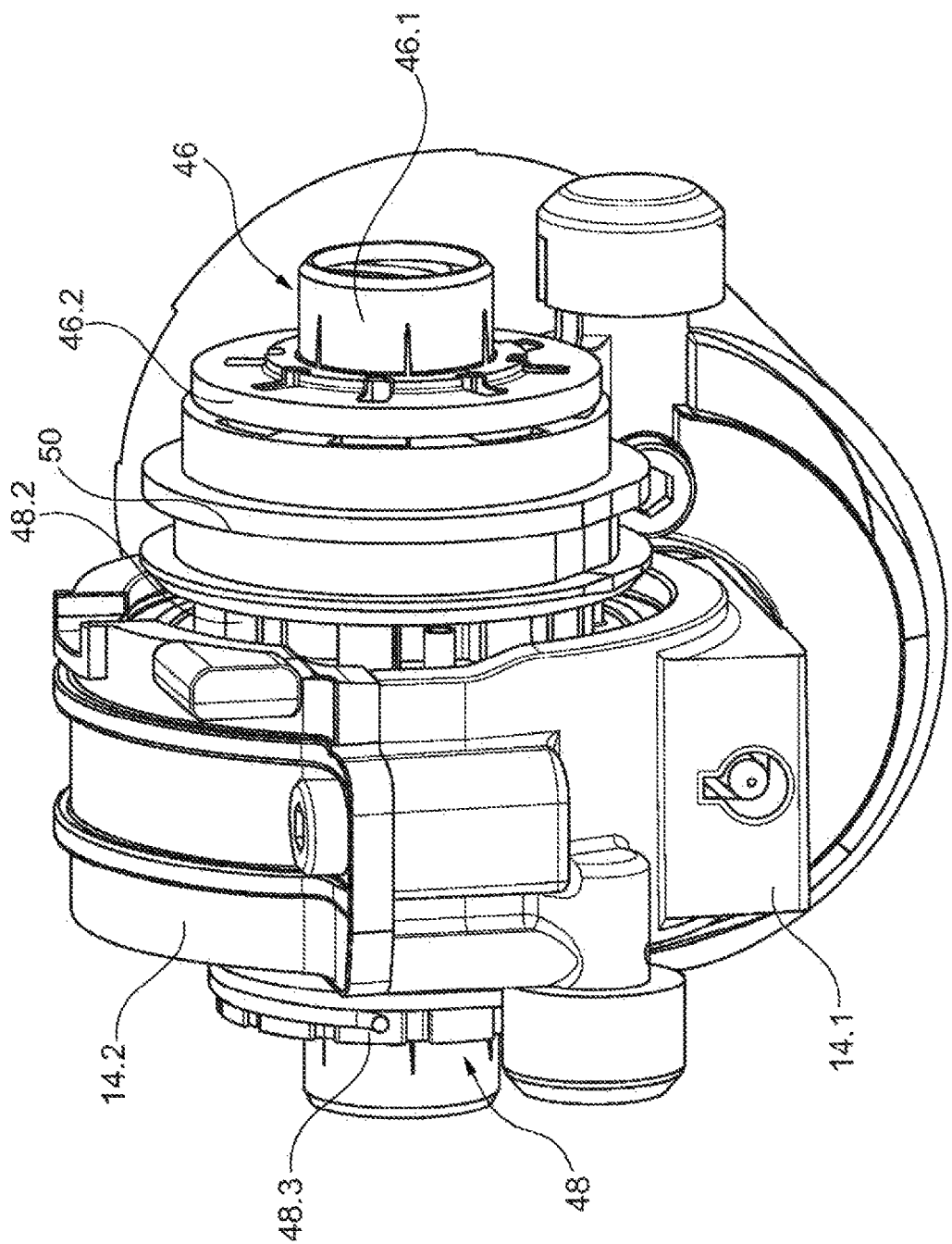
Figure 9:
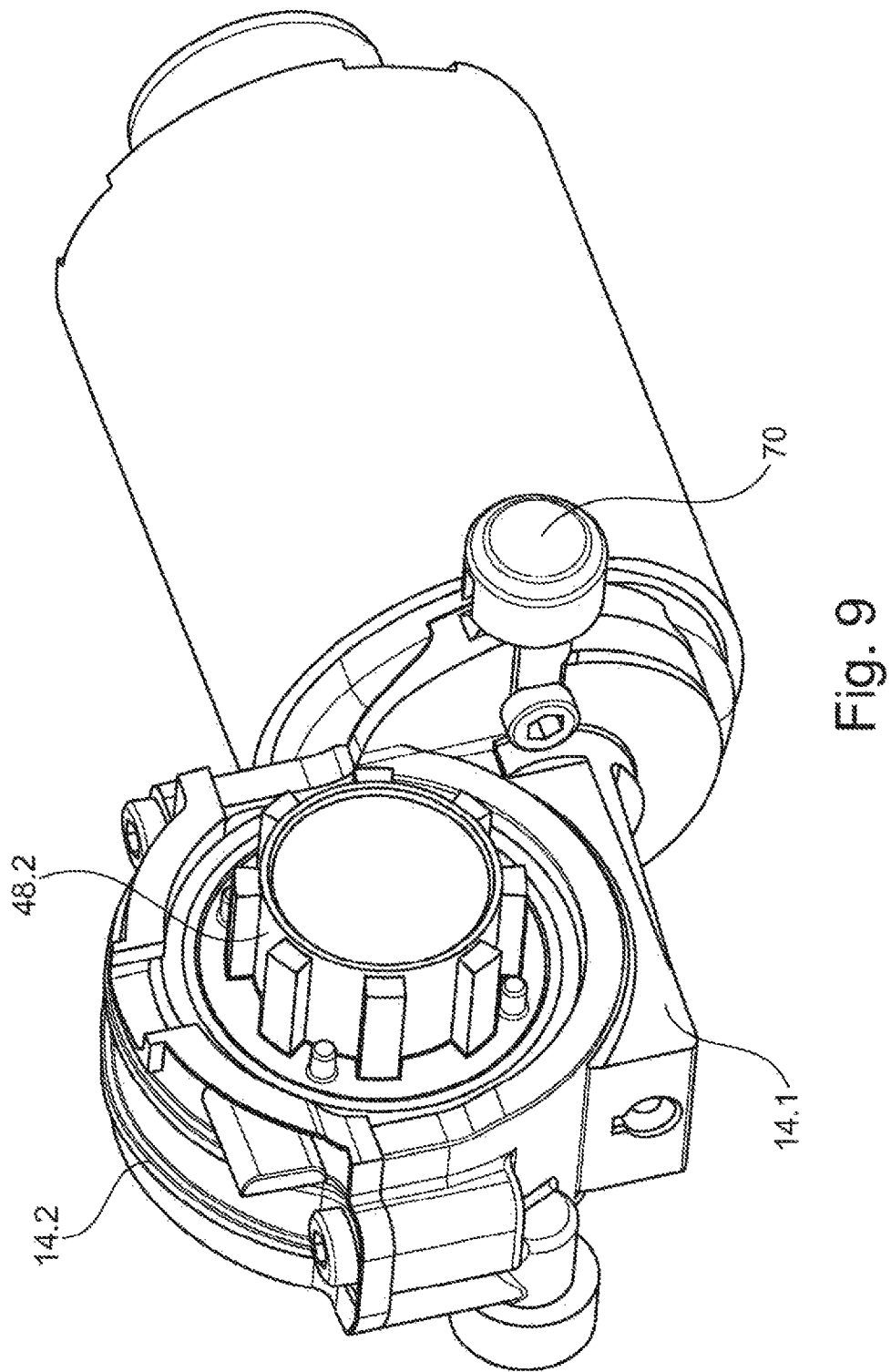
Figure 10:
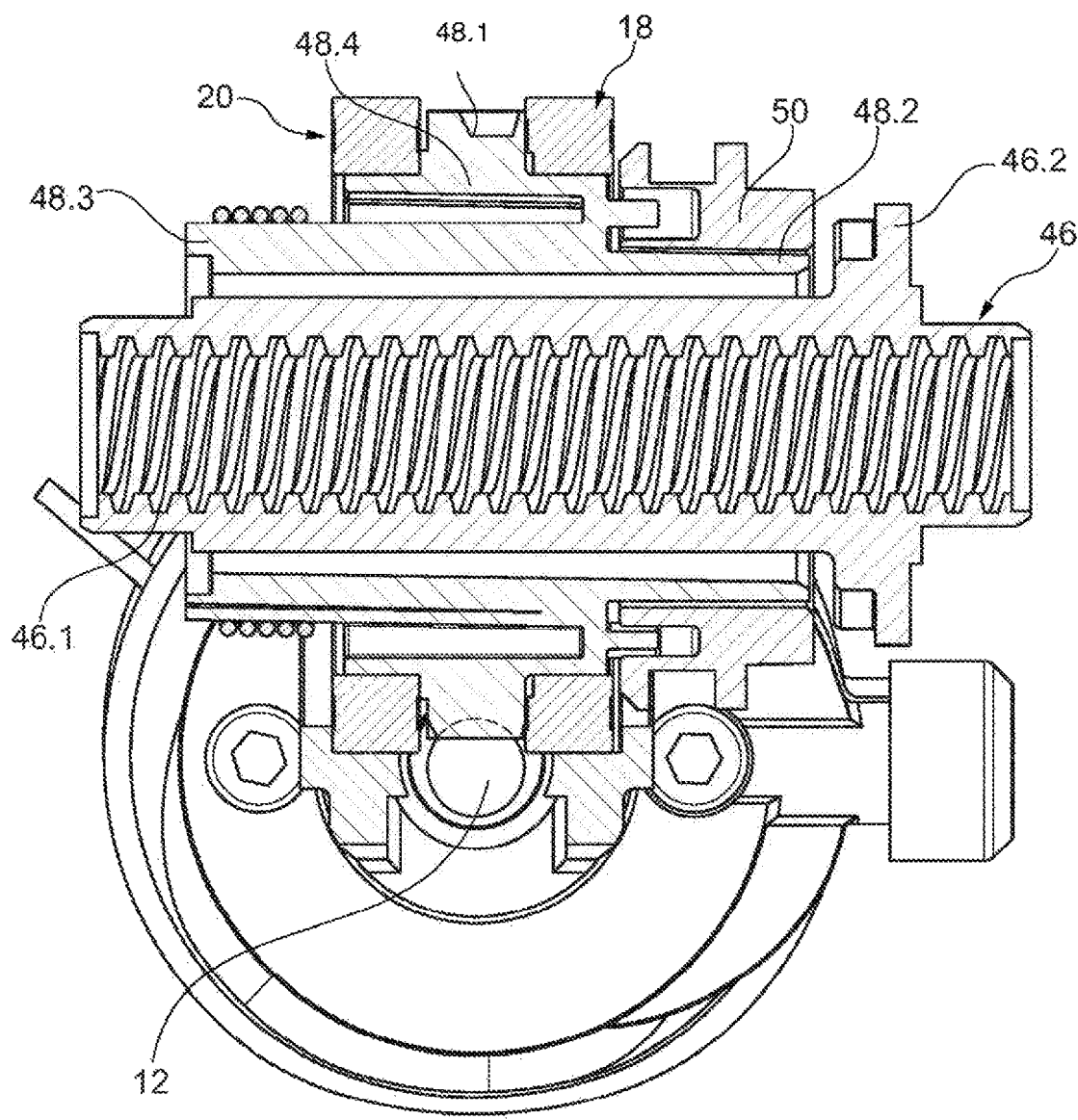
Figure 11:
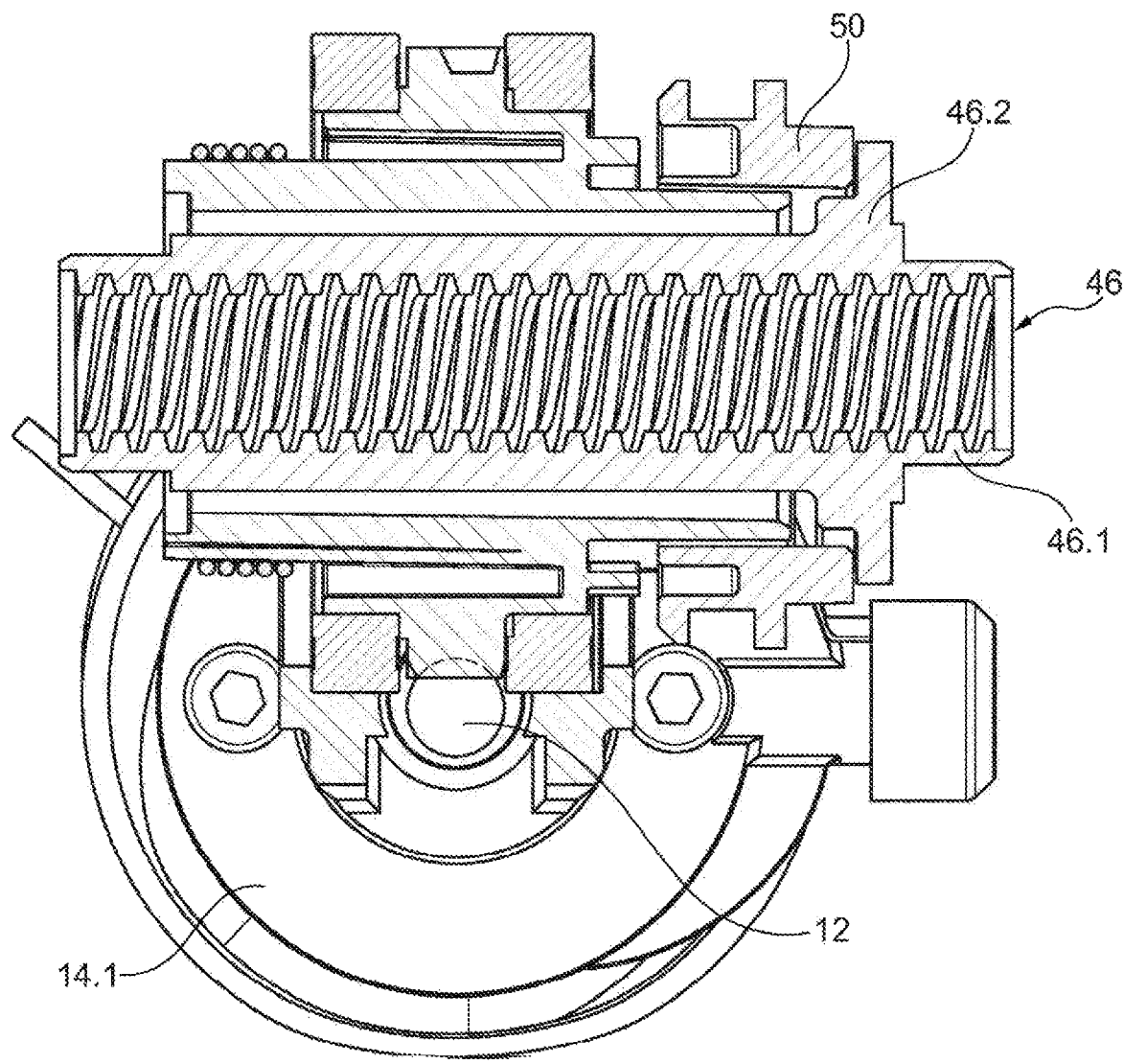
Figure 12:
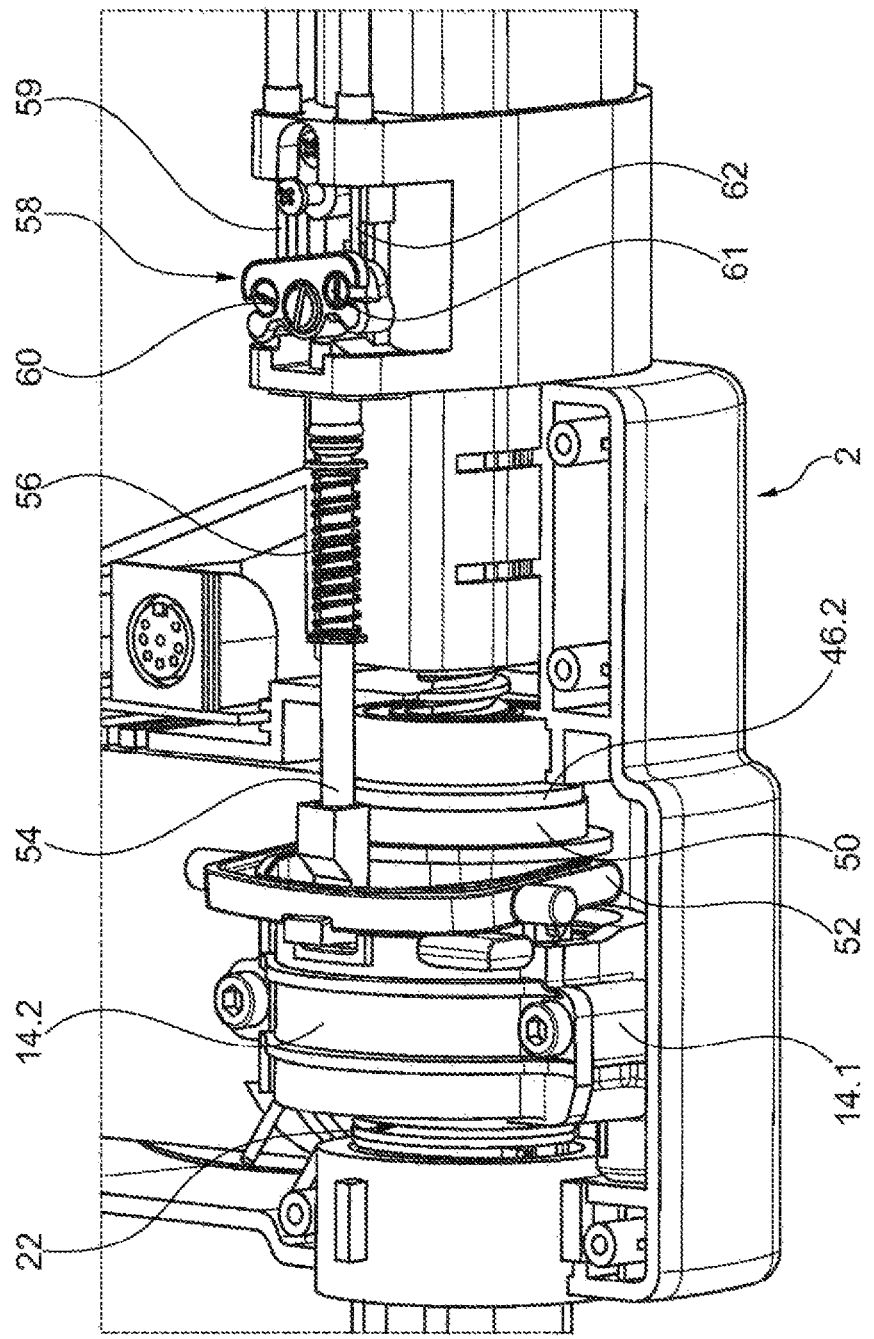
Figure 13:
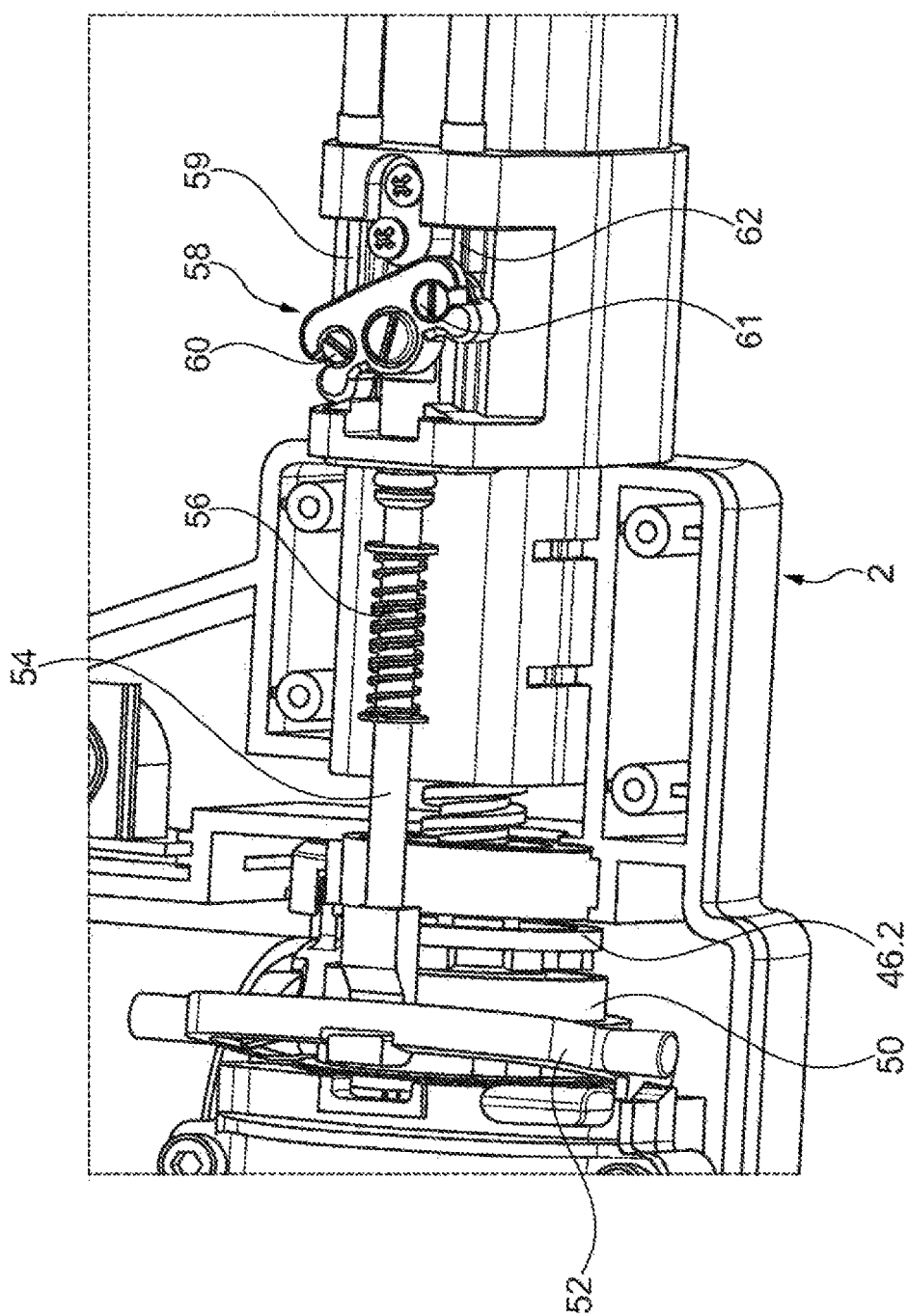
Figure 14:
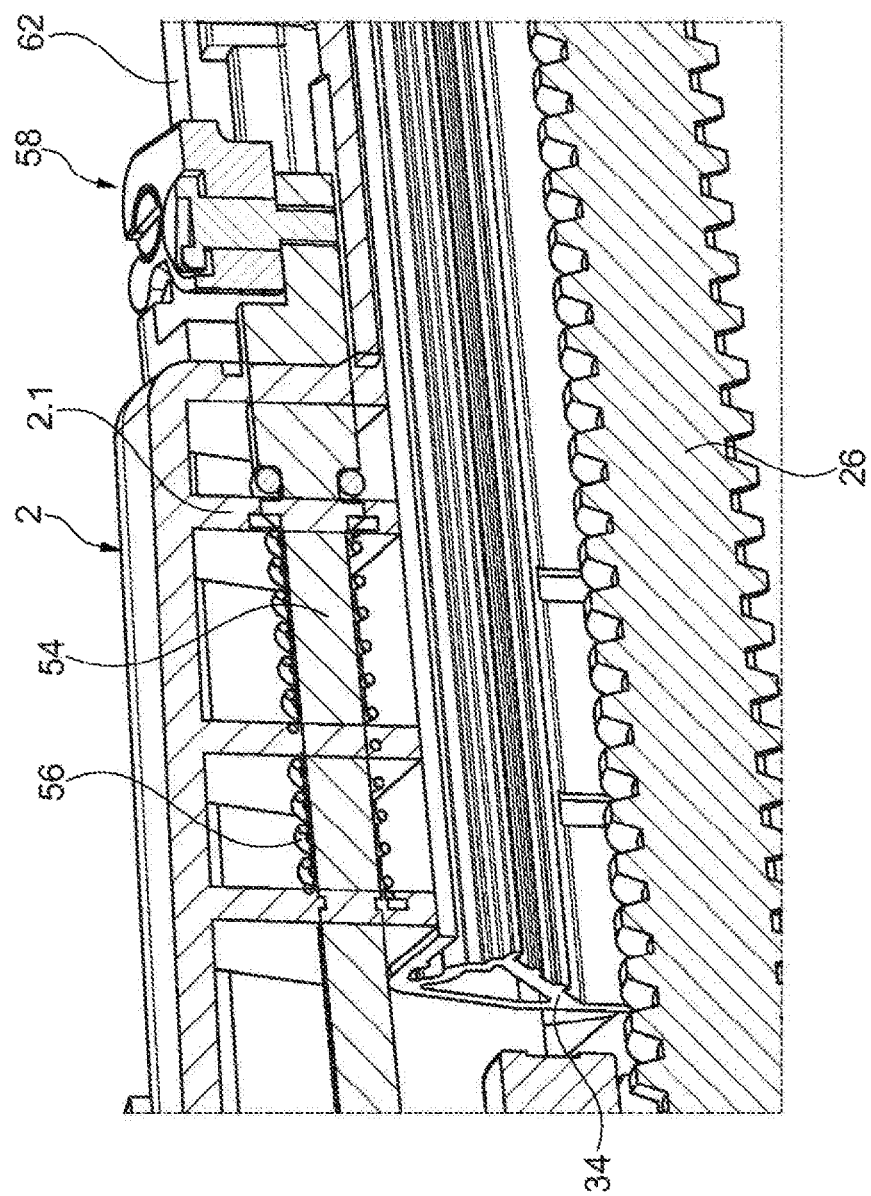
Figure 15:
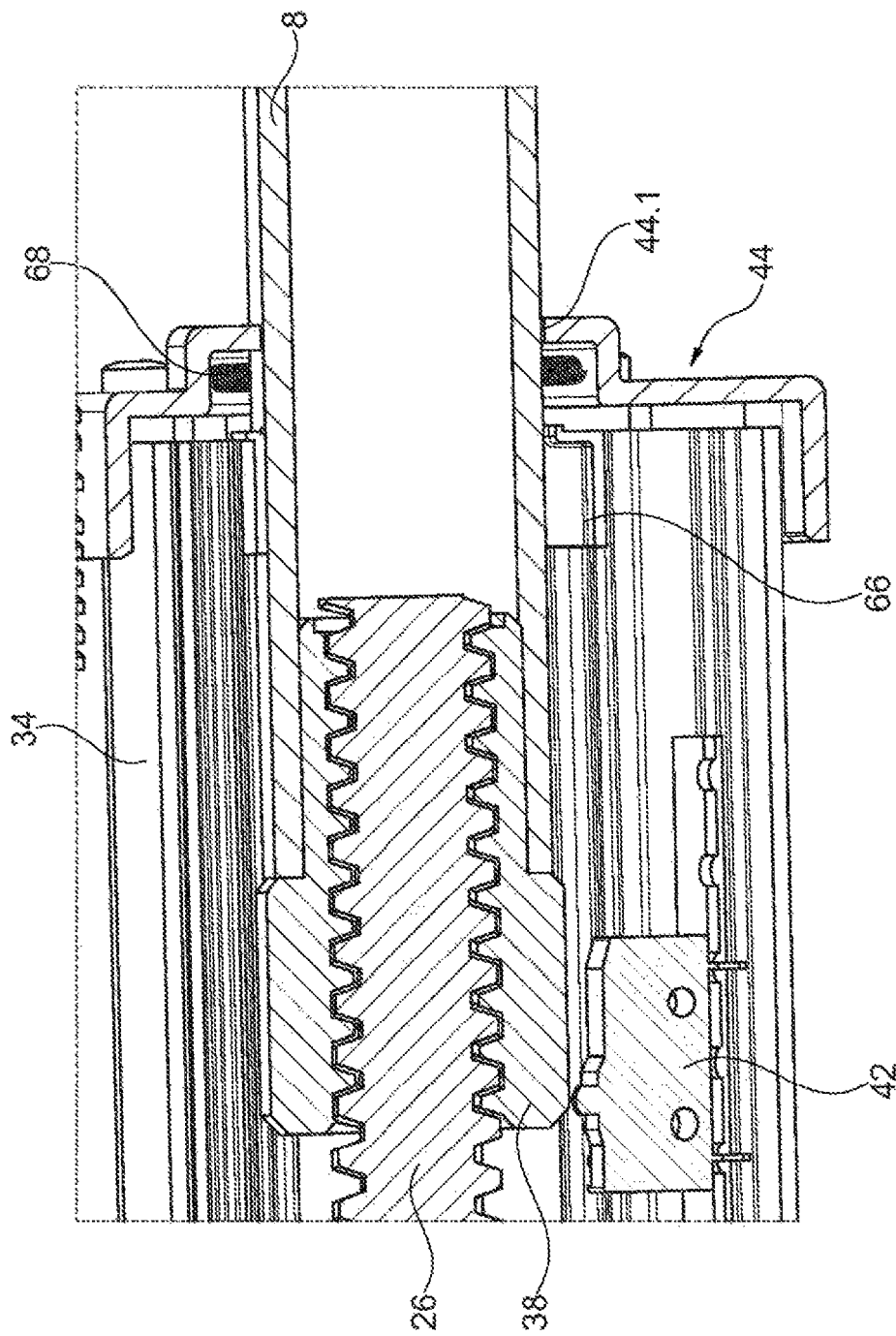
Figure 16:
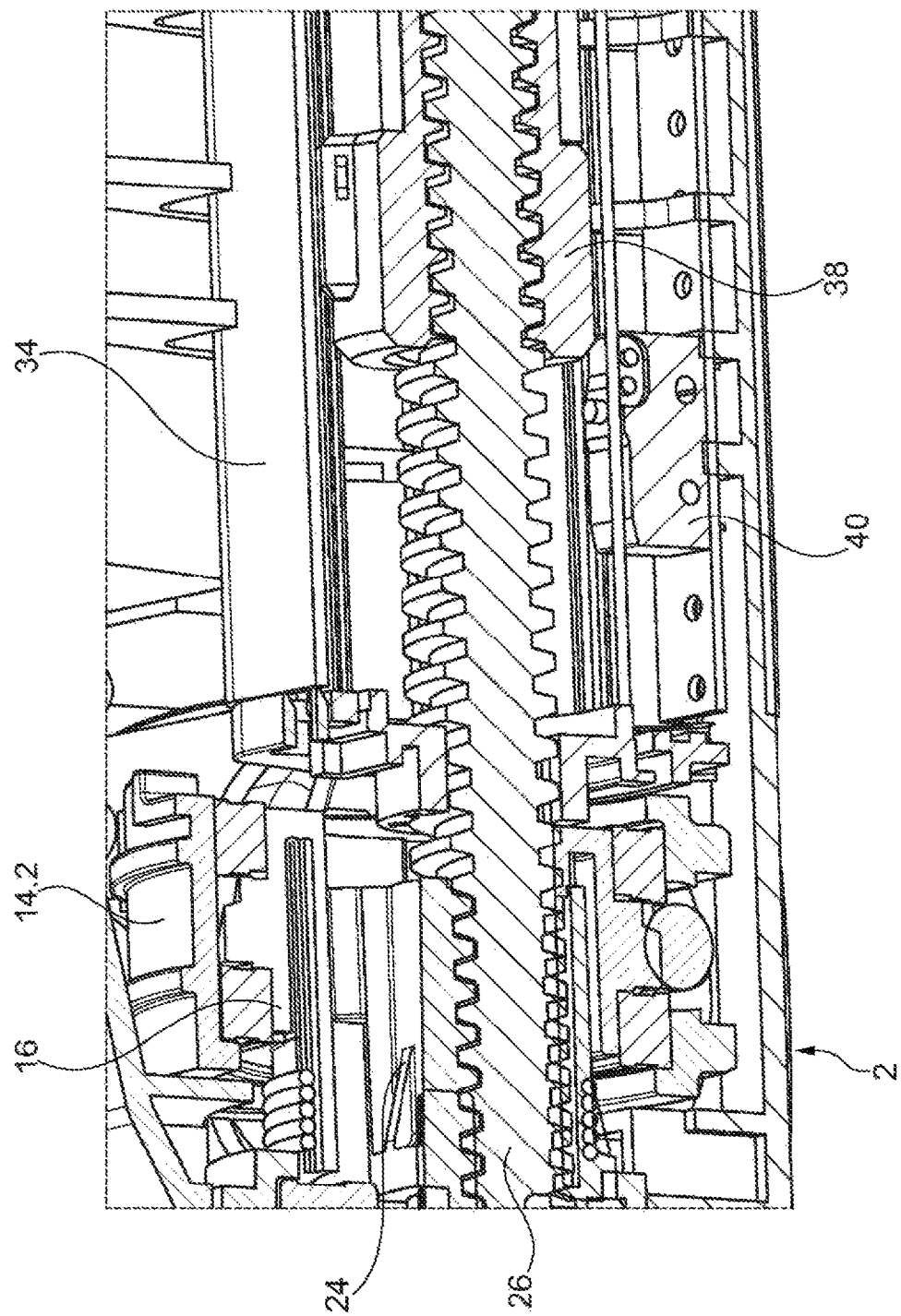
Figure 17:
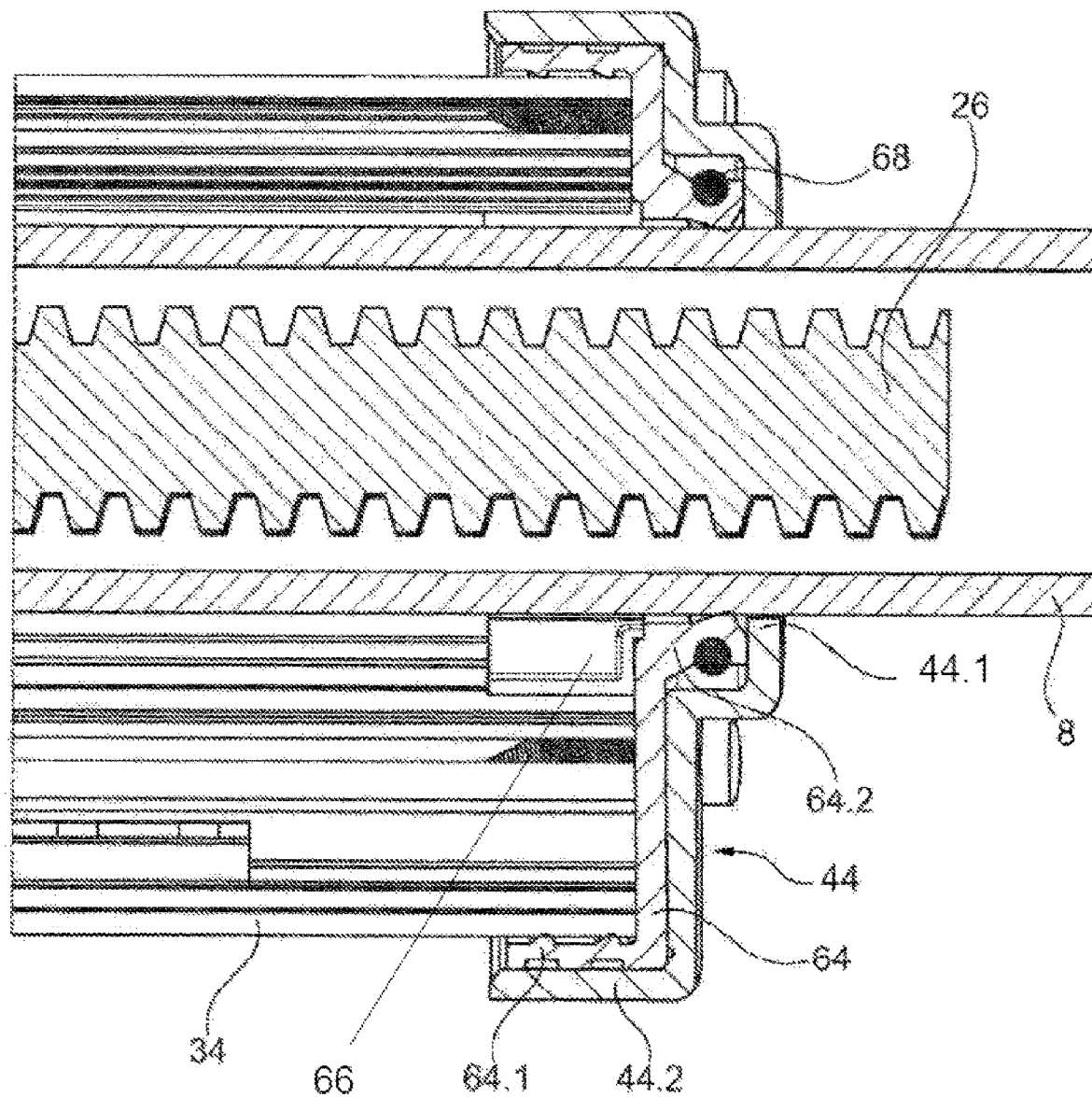
Figure 18:
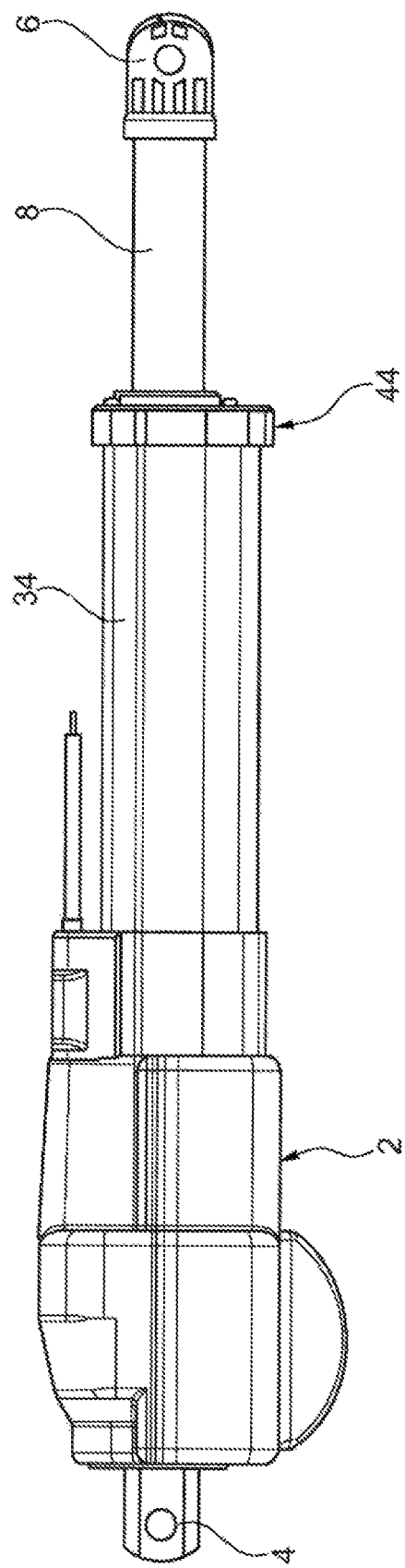
Figure 19:
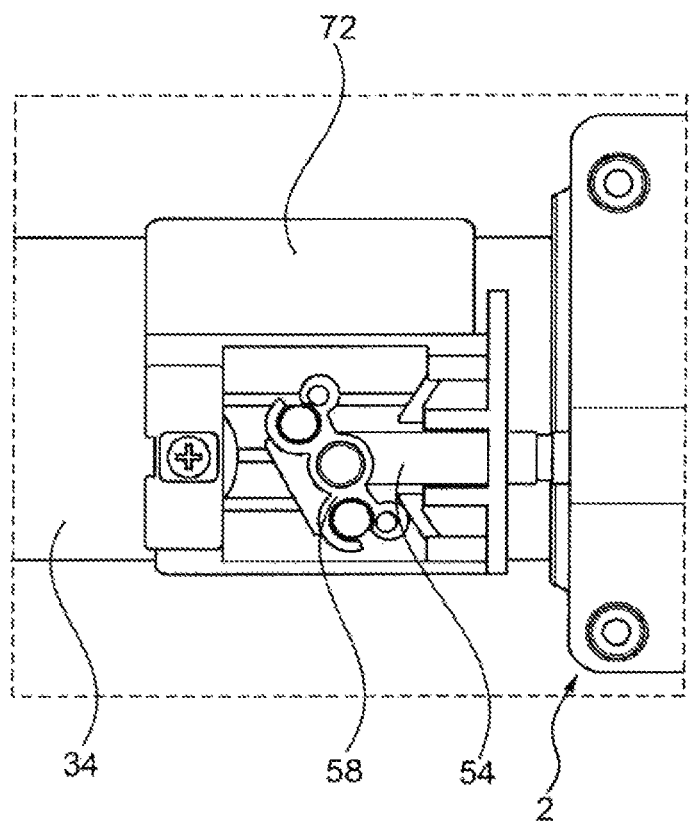

Reference lines are lines joining the reference numeral to the part in question. An arrow in contrast which does not touch any part relates to an entire unit towards which it is directed. The Figures are moreover not necessarily true to scale. For illustrating details certain regions may possibly be shown on an excessively large scale. In addition the drawings can be strikingly simplified and do not contain every detail which is possibly to be found in a practical structure. The terms "up" and "down" relate to the view in the Figures. In addition for reasons of greater clarity only one respective part is denoted by a reference numeral when there are a plurality of corresponding parts. In the Figures:

FIG. 1 shows a perspective end view of a motor unit including an electric motor with transmission angle portion fixed thereto and a worm gear accommodated therein according to the first embodiment without a coupler;

FIG. 2 shows an isometric front view of the motor unit of FIG. 1;

FIG. 3 shows an isometric view of the spindle holder according to the first embodiment without a coupler;

FIG. 4 shows an enlarged longitudinal section of the transmission end of the housing of the linear drive of the embodiment without a coupler;

FIG. 5 shows an isometric view of a spindle according to the invention with two diametrally opposite notches at the transmission end;

FIG. 6 shows a longitudinal section through the linear drive according to the first embodiment with the lift tube partially extended;

FIG. 7 shows a longitudinal section through the outer tube of the telescopic tube without lift tube;

FIG. 8 shows an end view of a motor unit including an electric motor with transmission angle portion fixed thereto and worm gear accommodated therein according to the second embodiment with a coupler;

FIG. 9 shows an isometric side view of the motor unit of FIG. 8;

FIG. 10 shows an end longitudinal section through the motor unit with the coupler in the uncoupled release position (emergency position);

FIG. 11 shows the view shown in FIG. 10 with the coupler in the coupled engagement position;

FIG. 12 shows an isometric plan view of the pull means functioning as an emergency adjustment and the rocker for actuating the coupler in the coupled engagement position;

FIG. 13 shows an enlarged isometric plan view of the emergency adjustment in the uncoupled release position with the pull means tightened;

FIG. 14 shows an enlarged isometric longitudinal section through the spring-loaded arrangement of the pull rod in the housing;

FIG. 15 shows an enlarged isometric longitudinal section through the front end of the telescopic tube with the lift tube extended;

FIG. 16 shows a longitudinal section through the transmission end of the first embodiment of the linear drive to illustrate the additionally achieved retraction distance of the lift tube by omitting the coupler;

FIG. 17 shows an enlarged longitudinal section through the front end of the telescopic tube with the end cover according to the invention;

FIG. 18 shows a longitudinal sections through a linear drive according to the invention, and FIG. 19 shows an enlarged plan view of an alternative embodiment of the emergency adjustment according to the invention without pull means.

DETAILED DESCRIPTION OF THE INVENTION

The entire linear drive in accordance with all aspects of the invention is shown in a side view in FIG. 18.

It substantially comprises a modular housing 2 with a drive end which is of a widened structure for accommodating an electric motor 10 with a transmission angle portion 14. Disposed at the transmission rear end of the housing 2 is a rear fork head 4. Arranged coaxially in relation to that rear fork head 4 at the distal outer end of a lift tube 8 received displaceably in an outer tube is a front fork head 6. The lift tube 8 can be extended and retracted in the axial longitudinal direction by means of the linear drive, from and into a telescopic tube which is partially accommodated in the central portion of the housing 2. The rear fork head 4 and the front fork head 6 can thus be secured to a bed or another article of furniture in known manner to implement an adjustment, for example for motorized pivotal movement of the head or foot end of a bed. An end cover 44 seals the front end between the outer tube 34 and the displaceably accommodated lift tube 8 of the telescopic tube to prevent the ingress of pressurized water jets in accordance with IP67W.

FIG. 1 shows an end view of a motor unit installed in the transmission end of the linear transmission, including an electric motor 10, from the front end of which there projects a worm shaft 12 which extends along a worm longitudinal axis and which is driven by the electric motor and which extends into a transmission angle portion 14 which is fixed at the front end to the electric motor 10 and there meshes with the outer tooth flank 16.1 of a worm gear 16 and thus drives same.

The transmission angle portion 14 is designed to be separable and includes two half-casing portions 14.1 and 14.2 which can be screwed together. A first—lower—half-casing portion 14.1 is fitted on the front side of the electric motor 10 and accommodates the worm shaft 12. That first half-casing portion 14.1 forms with the second—upper—half-casing portion 14.2 a closed annular space which accommodates the respective worm gear 16 by way of two bearings 18, 20 carried rotatably on bearing seats of the hollow shaft 16.2.

At the outer peripheral surface the worm gear 16 includes tooth flanks 16.1 and a continuous hollow shaft 16.2 extending axially in the longitudinal direction, wherein that hollow shaft at both sides beside the tooth flank 16.1 forms seat surfaces for bearings 18, 20, with which the worm gear 16 is rotatably accommodated in the transmission angle portion 14.

The worm gear 16 extends towards the rear end of the linear drive, forming a step of reduced outside diameter, into a brake connecting portion or journal 16.3 which is shaped integrally on the worm gear 16 and on which the turns of a wrap spring brake 22 are wound in known fashion. The turns 22 of the wrap spring brake are of a somewhat narrower inside diameter than the outside diameter of the brake connecting portion 16.3 so that the wrap spring brake 22 closely surrounds the brake connecting portion 16.3 in the installation position and upon rotation in the clamping direction functions as a brake while in the opposite direction it releases the brake connecting portion 16.3. The wrap spring brake 22 further includes a holding arm (not shown) which projects from the outer peripheral surface of the spring turns and which is inserted into an opening and fixes the wrap spring brake 22. The wrap spring brake 22 makes it possible for the linear transmission to be as smooth-running as possible, but at the same time avoiding unwanted return movement of the linear drive when the electric motor 10 is not powered.

Referring to FIG. 2 in the first embodiment of the linear transmission without a coupler, as shown in FIGS. 1 through 7, the inner peripheral surface of the hollow shaft 16.2 has a total of four recesses 16.4 which are respectively disposed in mutually diametrally opposite paired relationship and extend radially outwardly. In the installation position engaging into those recesses 16.4 are flanks 24.1 which project radially from a central, hollow-cylindrical spindle connecting portion 24.2 of the spindle holder 24 and which are therefore of a complementary configuration to the recesses 16.4 of the worm gear 16 and thus provide a positively locking and non-rotatable connection between the worm gear 16 and the spindle holder 24 accommodated therein.

The spindle connecting portion 24.2 of the spindle holder 24 in the installation position accommodates a spindle 26, for which purpose the inner peripheral surface of the spindle holder 24 has a female thread of a complementary configuration to that spindle 26. Preferably the spindle 26 has a trapezoidal thread. At the rear end the spindle connecting portion 24.2 has a step formed thereon of reduced outside cross-section to form a bearing seat 24.3. Carried on that bearing seat 24.3 is the inner race of a rear bearing 28 which is carried with its outer race in a bush 14.1 of the rear fork head 4. The rear transmission end of the spindle 26 has a blind hole with a female thread, into which is screwed a clamping screw 30 which presses a contact pressure disc 32 with a step against the inner race of the rear bearing 28 and thus presses it against the rear step of the spindle holder 24, that is formed by the bearing seat 24.3.

The non-rotatable connection between the spindle holder 24 and the spindle 26 is provided by the spindle 26, at the transmission rear end, having diametrally opposite notches 26.1, 26.2 which extend over a length of about 25 mm in the longitudinal direction and into which clamping pins or slotted spring pins (not shown) are driven, which upon being driven in deform the thread flights of the female thread of the spindle holder 24 and thus produce a non-rotatable connection between the spindle holder 24 and the spindle 26 accommodated therein.

Referring to FIG. 6 the transmission rear end of the telescopic tube is enclosed in the housing 2 and is held by a plurality of holding ribs 2.1 which are shaped on the housing 2 and which at the inside are integrally shaped on the housing 2.

Provided within the central lift tube space 36 in the outer tube 34 is a longitudinally displaceably arranged spindle nut 38 having a female thread meshing with the spindle 26, which therefore converts a rotation of the spindle 26, produced by way of the motor and the transmission unit, into a translatory movement in order to move the lift tube 8 relative to the outer tube 34. Two limit switches 40, 42 arranged at the underside in the outer tube 34 limit in known fashion the maximum adjustment travel of the spindle nut 38 within the outer tube 34. As soon as the spindle nut 38 with the widened portion at the rear end touches a sensor of the limit switches 40, 42 the electric motor stops the movement of the lift tube 8.

FIGS. 8 through 13 show the second embodiment of the linear transmission with the coupler for carrying out emergency adjustment. In this configuration the worm gear 48 which is again accommodated in the two half-casing portions 14.1, 14.2 of the transmission angle portion 14 and driven in rotation by the electric motor also has a coupling connecting portion 48.2 which projects radially out of the plane with the tooth flanks in mutually opposite relationship from the brake connecting portion or journal 48.3. That coupling connecting portion 48.2 is provided on its exterior with a plurality of radially outwardly projecting splines which engage with recesses of a complementary configuration on the inside of the sliding sleeve 50 of the coupler, that is arranged displaceably on the coupling connecting portion 48.2.

In this embodiment the spindle holder 46 again has a centrally extending spindle connecting portion 46.1 adapted for accommodating in its interior the spindle 26 and further having a coupling flange 46.2 which projects radially from the outer peripheral surface of the spindle connecting portion 46.1 and which at its side towards the coupling connecting portion 48.2 of the worm gear 48 has projections for engagement into the grooves provided on the inside on the sliding sleeve 50.

FIG. 8 shows the sliding sleeve 50 in the coupled position in which the worm gear 48 transmits the torque to the spindle holder 24 with the spindle 26 fixed therein in the above-described manner, that is to say by introducing clamping pins into the two notches 26.1, 26.2 at the transmission end of the spindle between the spindle connecting portion 46.1 and the spindle 26.

FIG. 9 shows a perspective side view of the electric motor 10 with the transmission angle portion 14 with the fitted worm gear 48, wherein the coupling connecting portion 48.2 which is in the form of a spline shaft can be particularly clearly seen here.

FIG. 10 shows an end view in longitudinal section through the worm gear 48 and the spindle holder 46 with its coupling flange 46.2 in the release position, that is to say uncoupled for emergency release.

FIG. 11 in contrast shows the sliding sleeve 50 in the coupled position for transmission of the torque from the worm gear 48 to the spindle holder 46.

FIG. 12 shows the emergency release coupler according to the invention in the non-loaded, that is to say coupled engagement position in which the rocker 52 mounted pivotably in the center on the housing urges the axially displaceable sliding sleeve 50 on to the coupling connecting portion 46.2 of the spindle holder 46 and brings it into engagement with the spline tooth arrangement also provided thereon.

FIG. 13 shows an enlarged isometric plan view upon actuation of the Bowden cable 62 in the course of emergency release. The cable thimble 61 arranged at the end of the Bowden cable 62 rotates the Bowden cable holder 58 about the central fixing pin and pulls the pull rod 54 back against the spring stressing of the spring 56 in the housing so that the sliding sleeve 50 is transferred from the coupled engagement position shown in FIG. 12 into the release or freewheel position of being uncoupled as shown in FIG. 13. In that position in which the sliding sleeve 50 is displaced towards the left in the Figure, that is to say axially, there is therefore a freewheel action so that a portion of the hospital bed that is connected to the spindle nut can be immediately lowered.

FIG. 7 shows a cross-section through the outer tube 34 which is accommodated in the housing 2 and which has a plurality of ribs or legs 34.1 projecting inwardly from the outer peripheral surface for forming a central lift tube space 36 in which the lift tube 8 (not shown in FIG. 7) is displaceably guided. In addition provided on the inside in the outer tube 34 are a plurality of screw passages 34.2 into which cap-like end covers 44 arranged at the ends can be fixed for closing the outer tube 34 or the telescopic tube.

It is possible to clearly in FIG. 6 the cap-like end cover 44 fixed to the front end of the outer tube 34 for sealingly and longitudinally displaceably mounting the lift tube 8 within the outer tube 34 and at the same time closing the outer tube 34 in relation to the entry of pressurized and spray water in accordance with IP67W.

FIG. 16 shows the linear drive according to the first embodiment without a coupler to illustrate the additional possible inward displacement of the lift tube 8 which is achieved by omission of the coupler so that, with the embodiment without a coupler, retraction of the lift tube 8 into the outer tube 34, which is further by up to 35 mm, is possible.

FIG. 17 shows the structure of this end cover 44 according to the invention in greater detail. It includes an elastic seal 64 which defines a main sealing plane bearing against the end of the outer tube 34 and at the outer edge a peripheral collar 64.1 which extends rearwardly transversely relative to the main sealing plane and having inner and outer seal lips which bear under a prestressing against the outside of the outer tube 34 and the inside of a collar 44.2 of complementary configuration on the end cover 44. In addition the seal 64 has a seal connecting portion 64.2 projecting forwardly from the main sealing plane and having an inside seal lip which bears against the outside of the lift tube 8 and is held under a spring stressing by a peripherally extending annular spring 68 in a condition of permanent prestressing.

According to the invention the end cover 44 is also in the form of a lift tube guide cap and therefore represents a prolonged outwardly extending support for the lift tube 8. The lift tube 8 is held on the inside in the outer tube 34 at the end by a hollow-cylindrical bush 66 which is fitted with a front-side abutment flange into the end between the outer tube 34 and the lift tube and forms a first lift tube guide. The end cover 44 also includes a second lift tube guide 44.1 which projects forwardly from the primary cover surface covering the outer tube and which also defines an annular space accommodating the annular spring 68 of the spring seal. In the present case therefore the contact length from the hollow-cylindrical bush 66 to the outside lift tube guide 44.1 is extended from 53 to 61 mm.

FIG. 14 shows an enlarged longitudinal section through the upper end of the linear transmission with the housing cover fitted in place and a pull rod 54 which is mounted therein and which is spring-biased in relation to holding ribs 2.1 provided on the inside and at the rear end of which the Bowden cable holder 58 is moveably mounted by way of the central pivot pin which is screwed rotatably into the end of the pull rod 54.

The electric motor 10 is preferably rubber-mounted to compensate for vibration and for noise reduction, wherein preferably a plurality of rubber plugs 70 are fitted on to the electric motor 10, bearing against a respective counterpart component or a joint partner.

FIG. 19 shows an enlarged plan view of an alternative emergency adjustment or emergency coupler with the Bowden cable holder 58 which is rotatably snap-fitted on a trunnion 72 at the front end of the pull rod 54. As in the first embodiment shown in FIGS. 12 through 14 the Bowden cable holder 58 has openings for the insertion of the end cable thimbles 60, 61 (not shown). In contrast to the first embodiment of FIGS. 12 through 14 the rear contact surfaces arranged in opposite relationship to the direction of pull are not straight but project rearwardly inclined at an angle of about 45° from the central guide of the pull rod 54. That configuration provides that, upon one-sided actuation of the Bowden cable holder 58 or upon actuation thereof on one side the Bowden cable which is not actuated is tensioned on the other side and this therefore prevents the Bowden cable which is not loaded from jumping out.

In addition in order to provide for a smooth movement between the components rounded configurations are provided between the rear side of the Bowden cable holder 58 and the rear contact surface, those rounded portions preferably being in the form of semicircular projections at the rear side of the Bowden cable holder.

Finally in this embodiment the Bowden cable holder 58 is integrated into a bracket or clip 72 which is pushed on to the outer tube 34 of the linear drive.

The subject-matter of the present invention involves not only the subjects of the individual claims but also the combination of the individual claims with each other. All features and details disclosed in the documents—including the Abstract—, in particular the spatial configuration shown in the drawings, are claimed as being essential to the invention insofar as they are novel individually or in combination over the state of the art.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A telescopic tube for use in a linear drive, the telescopic tube extending along a longitudinal axis and comprising: a rear drive end receivable in the linear drive and a substantially stationary outer tube adapted for receiving a lift tube which is longitudinally displaceable relative thereto, the rear drive end, through which there extends a motor-driven spindle on which is carried a spindle nut which is longitudinally displaceable by rotation of the spindle and which engages the lift tube, a front end at which the lift tube projects from the outer tube, the front end being closable by an end cover which includes a seal comprising a seal plate covering the front end and extending in a main-seal plane in order to prevent media entry, wherein the seal has a seal portion with at least one seal lip which bears sealing against an outside surface of the lift tube and a spring is provided at the seal portion, wherein the seal plate comprises on its outer peripheral surface an outer edge embracingly bearing against the outer tube under a prestressing, the end cover comprises an attachment cap extending in a cover plane that is located transverse to the longitudinal axis in an assembled position, an external peripheral edge is provided on and extends rearwardly from the cover plane for externally enclosing the outer tube with the outer edge of the seal, a receiving space projects forwardly from the cover plane, the seal portion and the spring received in the receiving space, and a lift tube guide is provided on the forward end of the receiving space of the attachment cap.

2. The telescopic tube as set forth in claim 1 wherein the spring includes a coil spring.

3. The telescopic tube as set forth in claim 1 wherein the end cover has a first inner guide portion and a second outer guide portion.

4. The telescopic tube as set forth in claim 3 wherein the inner guide portion includes a bush which can be fitted into the outer tube and the outer guide portion has a lift tube guide.

5. A telescopic tube for use in a linear drive, the telescopic tube extending along a longitudinal axis and comprising:
a substantially stationary outer tube;
a lift tube disposed in the outer tube and longitudinally displaceable relative thereto;
a rear drive end receivable in the linear drive;
a motor-driven spindle extending through the rear drive end;

a spindle nut carried on the motor-driven spindle and engaged with the lift tube, the spindle nut longitudinally displaceable by rotation of the spindle;

a front end at which the lift tube projects from the outer tube;

an end cover enclosing the front end, the end cover comprising:
- an attachment cap extending in a cover plane that is located transverse to the longitudinal axis in an assembled position,
- an external peripheral edge provided on and extending rearwardly from the cover plane;
- a receiving space projecting forwardly from the cover plane;
- a lift tube guide provided on a forward end of the receiving space; and
- a seal comprising:
  - a seal plate covering the front end and extending in a main-seal plane preventing media entry;
  - an outer edge on an outer peripheral surface of the seal plate embracingly bearing against the outer tube under a prestressing;
  - a seal portion with at least one seal lip which bears tightly against an outside surface of the lift tube; and
  - a spring provided at the seal portion,
  - wherein the seal portion and the spring are received in the receiving space, and wherein the external peripheral edge externally encloses the outer tube with the outer edge of the seal.

* * * * *